UNITED STATES PATENT OFFICE.

LEONARD ROBERTS COATES, OF BALTIMORE, MARYLAND.

FERTILIZER AND METHOD OF PRODUCING SAME.

947,796.  Specification of Letters Patent.  Patented Feb. 1, 1910.

No Drawing.  Application filed April 26, 1909. Serial No. 492,288.

*To all whom it may concern:*

Be it known that I, LEONARD ROBERTS COATES, of the city of Baltimore and State of Maryland, have invented certain Improvements in Fertilizers and the Methods of Producing the Same, of which the following is a specification.

In my application Serial No. 429287 filed on the 26th day of April 1909, for an improvement in a method of producing a fertilizer, I have stated in substance, that the invention consists in inoculating a sterilized food for bacteria, with a pure culture of the micro-organisms found in breaking-down rock, and which probably are the bacilli *Proteus vulgaris* (Hauser) and classified under the heading "Non-pathogenic bacilli; liquefying", in Sternberg's *Text-Book of Bacteriology*, New York, 1901, which have the property of rendering available for a plant food, the insoluble salts of phosphorus, potash and lime. But it is well known that another class of micro-organisms are essential to plant life, viz., those which gather and fix nitrogen from the air, and which are believed to belong to the classification known as *Pseudomonas radicicola*.

The present invention is for the purpose of carrying out simultaneously, both of the said processes of fertilization; and with this in view, I produce a commercial fertilizer as follows: I take a sterilized culture mixture preferably an aqueous solution of sugar and phosphate of potash, which is well adapted to promote the life and multiplication of bacteria, and to this I add breaking-down rock carrying therewith, micro-organisms which in natural processes are effecting the changes in the insoluble salts before mentioned, and also add to the culture-mixture a pure culture of the micro-organisms having their habitat in the nodules of leguminous plants, and generally believed to belong to the class *Pseudomonas radicicola*. These classes of micro-organisms are found not to be antagonistic or incompatible with respect to each other, and when in the presence of a suitable food, will multiply and perform their distinctive functions for an indefinite period. I then take ground raw bone, or some analogous food for bacteria, and after sterilizing the same moisten it with the pure culture of the classes of micro-organisms before referred to.

By this process I produce a concentrated fertilizer which contains only the classes of micro-organisms which I believe to be necessary for the fertilization of arid lands, or the improvement of lands which have become impoverished by the exhaustion of plant-food-producing micro-organisms.

I am aware that fertile soils contain to a more or less extent, both classes of micro-organisms before mentioned, and that the same may be said of stable manure; but it is not unusual in transferring soil from one farm to another, to carry with it harmful or deleterious bacteria or micro-organisms; and it is well known that stable manure notwithstanding the fact that it may contain the micro-organisms which I use in connection with a food as a fertilizing medium, but also containing yeast germs and poisonous fungi which are propagated in the soil to which the stable manure is applied.

With my improved fertilizer I introduce into the soil only such micro-organisms which are known to be beneficial to plant life, all others which are detrimental to plant growth being excluded.

I claim as my invention,—

1. A commercial fertilizer which consists of a sterilized food for micro-organisms or bacteria, which is inoculated with a pure culture of the micro-organisms found in breaking-down rock, and also those found, or having their habitat in the nodules of leguminous plants, and classified as *Pseudomonas radicicola*, substantially as specified.

2. The process of producing a commercial fertilizer which consists in preparing a sterilized food for bacteria; then adding to a sterilized culture-mixture, breaking-down rock whereby the insoluble salts of phosphorus potash and lime in the said rock are rendered available for fertilizing purposes; then adding to the inoculated culture mixture a pure culture of the micro-organisms classified as *Pseudomonas radicicola* having their habitat in the nodules of leguminous plants, and then treating the sterilized food with the inoculated culture-mixture, substantially as specified.

LEONARD ROBERTS COATES.

Witnesses:
WM. T. HOWARD,
HUGH L. BOND, 3rd.